Figure 3:
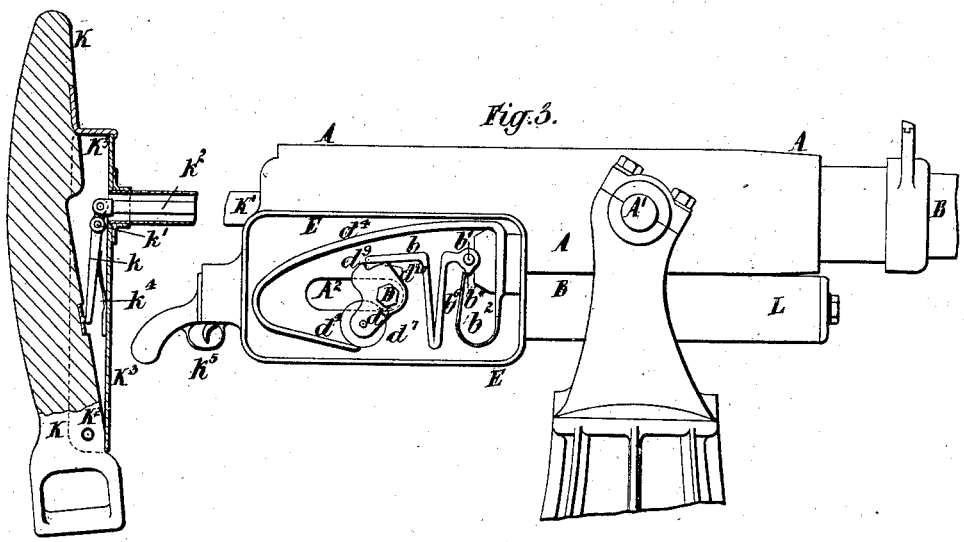

(No Model.) 24 Sheets—Sheet 1.

H. S. MAXIM.
AUTOMATIC BREECH LOADING GUN.

No. 453,702. Patented June 9, 1891.

Witnesses:
Ernest Hopkinson
Frank D. Murphy

Inventor
Hiram S. Maxim
By Duncan, Curtis & Page
attys.

(No Model.) 24 Sheets—Sheet 2.
H. S. MAXIM.
AUTOMATIC BREECH LOADING GUN.
No. 453,702. Patented June 9, 1891.
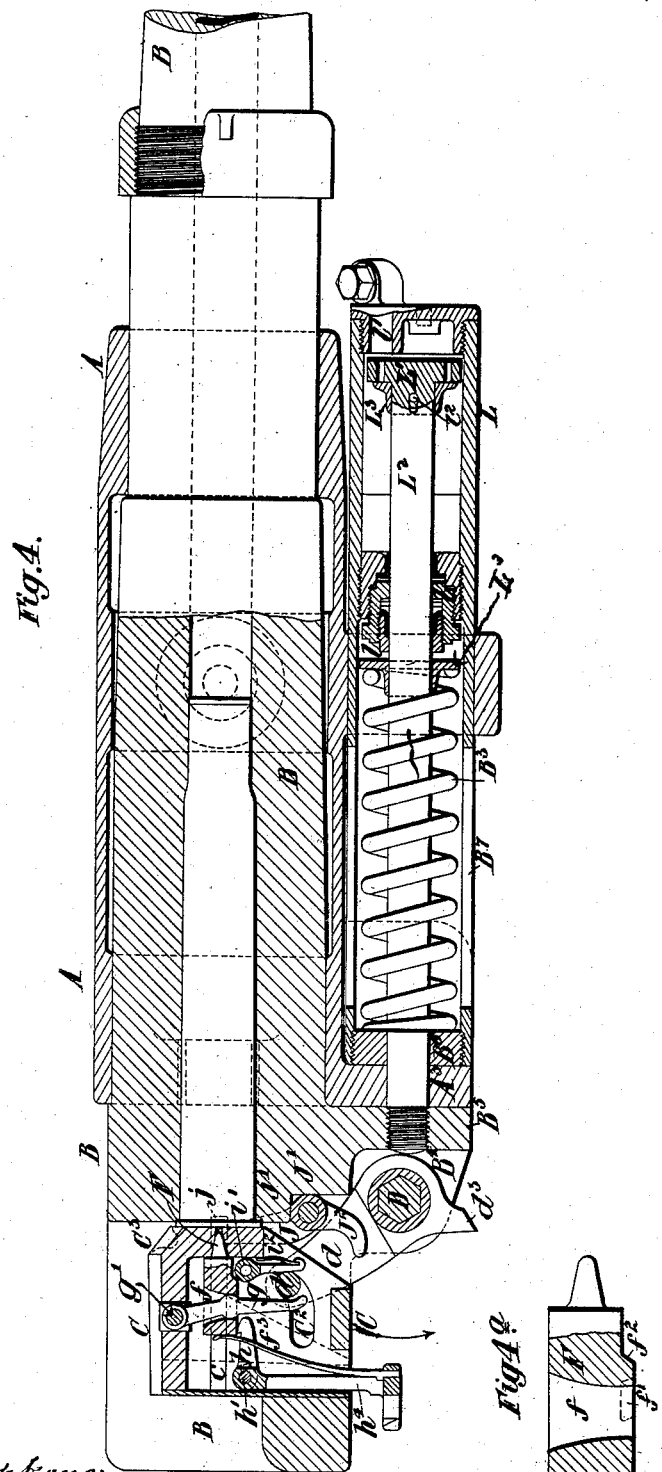

(No Model.) 24 Sheets—Sheet 3.
H. S. MAXIM.
AUTOMATIC BREECH LOADING GUN.
No. 453,702. Patented June 9, 1891.
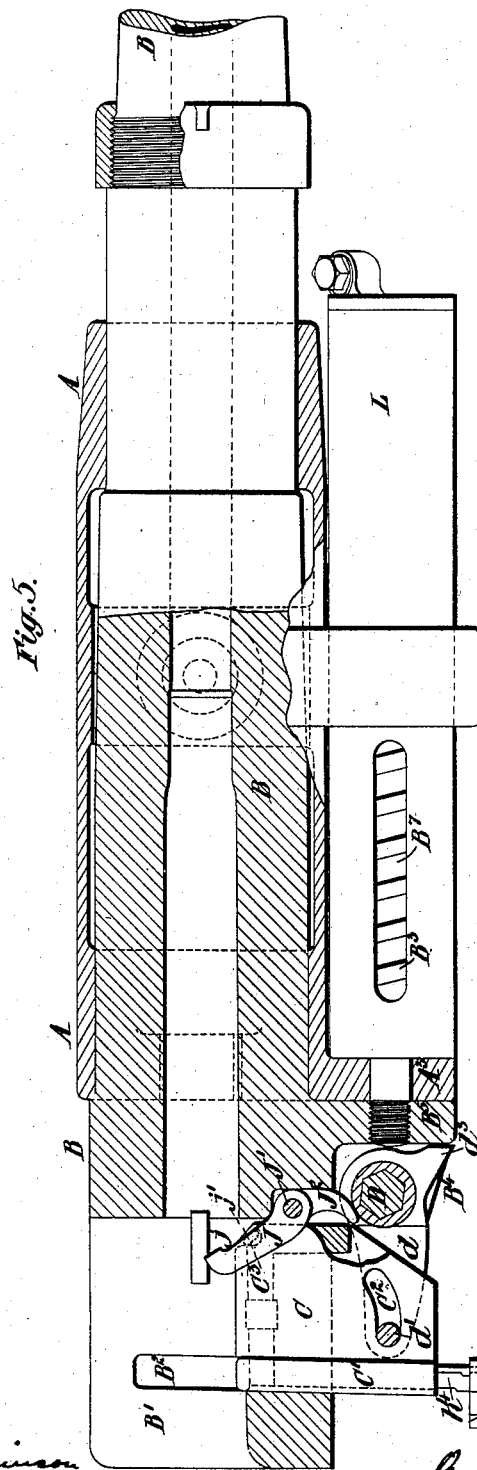

(No Model.)
24 Sheets—Sheet 4.
H. S. MAXIM.
AUTOMATIC BREECH LOADING GUN.
No. 453,702. Patented June 9, 1891.
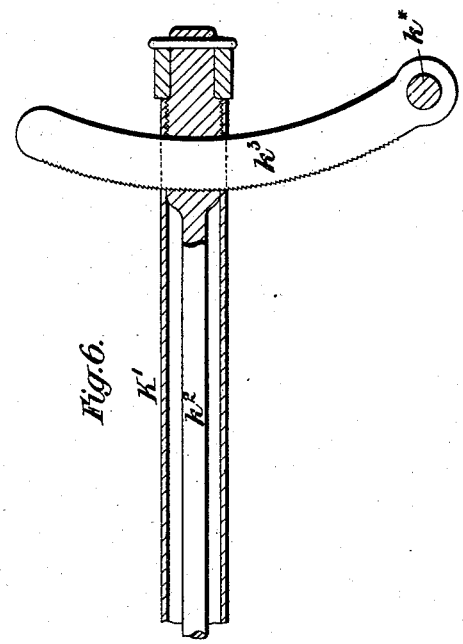
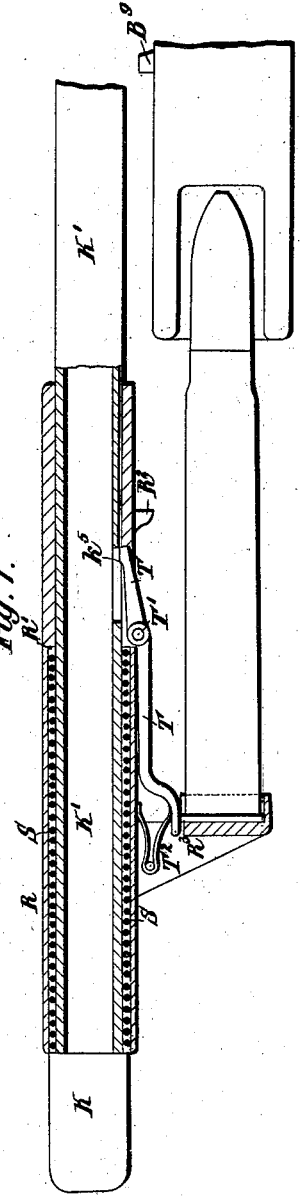

(No Model.) 24 Sheets—Sheet 5.
H. S. MAXIM.
AUTOMATIC BREECH LOADING GUN.
No. 453,702. Patented June 9, 1891.
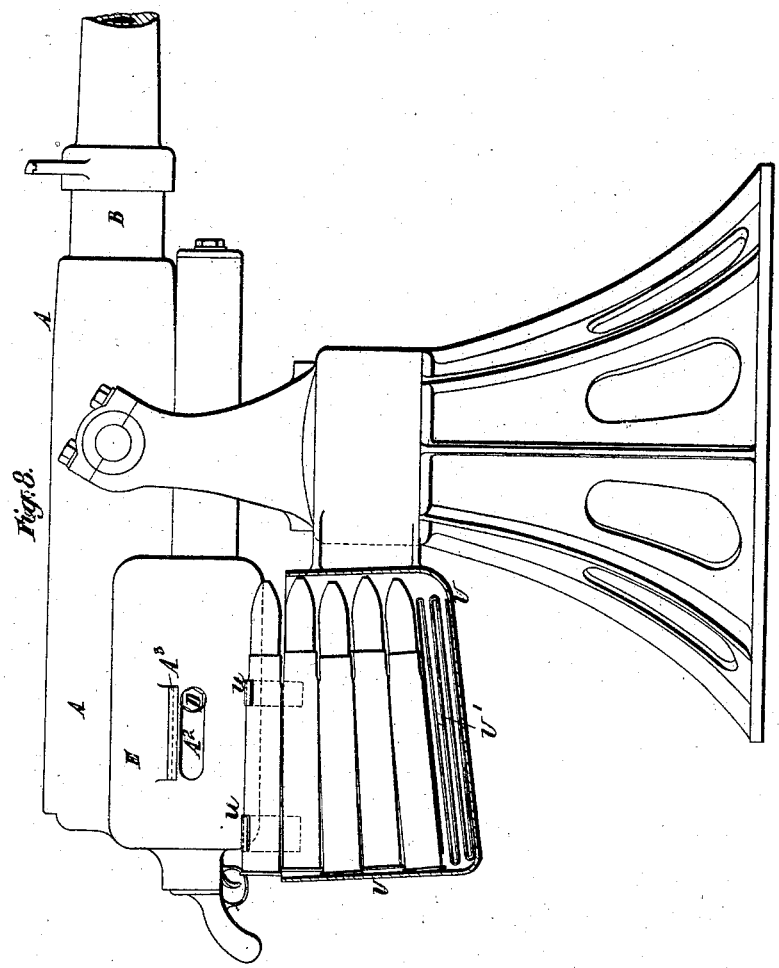

(No Model.)   H. S. MAXIM.   24 Sheets—Sheet 6.
AUTOMATIC BREECH LOADING GUN.

No. 453,702.   Patented June 9, 1891.

Witnesses:
Ernest Hopkinson
Frank P. Murphy

Inventor:
Hiram S. Maxim
By Duncan Curtis & Page
Attys (No Model.)  
24 Sheets—Sheet 7.

H. S. MAXIM.
AUTOMATIC BREECH LOADING GUN.

No. 453,702. Patented June 9, 1891.

Witnesses:  
Ernest Hopkinson  
Frank B. Murphy

Inventor  
Hiram S. Maxim  
By Duncan, Curtis & Page  
Attys.

(No Model.) 24 Sheets—Sheet 8.
H. S. MAXIM.
AUTOMATIC BREECH LOADING GUN.
No. 453,702. Patented June 9, 1891.
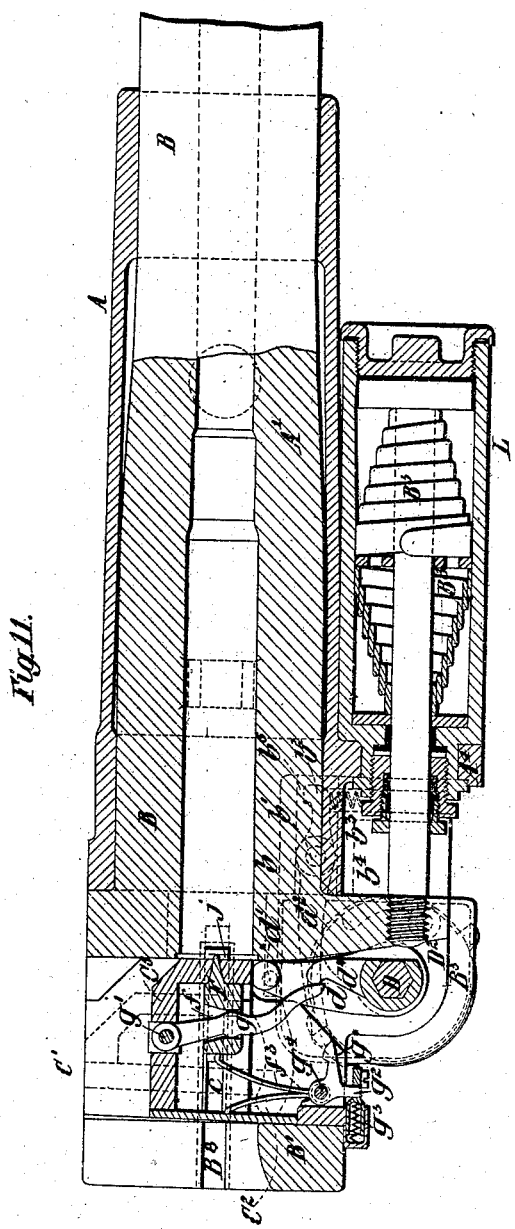

(No Model.) 24 Sheets—Sheet 9.

H. S. MAXIM.
AUTOMATIC BREECH LOADING GUN.

No. 453,702. Patented June 9, 1891.

(No Model.) 24 Sheets—Sheet 10.

H. S. MAXIM.
AUTOMATIC BREECH LOADING GUN.

No. 453,702. Patented June 9, 1891.

(No Model.) 24 Sheets—Sheet 11.
H. S. MAXIM.
AUTOMATIC BREECH LOADING GUN.

No. 453,702. Patented June 9, 1891.

(No Model.)
24 Sheets—Sheet 12.

H. S. MAXIM.
AUTOMATIC BREECH LOADING GUN.

No. 453,702.
Patented June 9, 1891.

(No Model.)   24 Sheets—Sheet 13.

H. S. MAXIM.
AUTOMATIC BREECH LOADING GUN.

No. 453,702.   Patented June 9, 1891.

Witnesses:
Ernest Hopkinson
Frank B. Murphy

Inventor
Hiram S. Maxim
By Duncan, Curtis & Page
atty's (No Model.)

24 Sheets—Sheet 14.

H. S. MAXIM.
AUTOMATIC BREECH LOADING GUN.

No. 453,702. Patented June 9, 1891.

Witnesses:
Ernest Hopkinson
Frank B. Murphy

Inventor:
Hiram S. Maxim
By Duncan, Curtis & Page
attys.

(No Model.)  24 Sheets—Sheet 16.

H. S. MAXIM.
AUTOMATIC BREECH LOADING GUN.

No. 453,702. Patented June 9, 1891.

Witnesses:

Inventor
Hiram S. Maxim
By Duncan, Curtis & Page
attys.

(No Model.)
H. S. MAXIM.
AUTOMATIC BREECH LOADING GUN.
No. 453,702. Patented June 9, 1891.
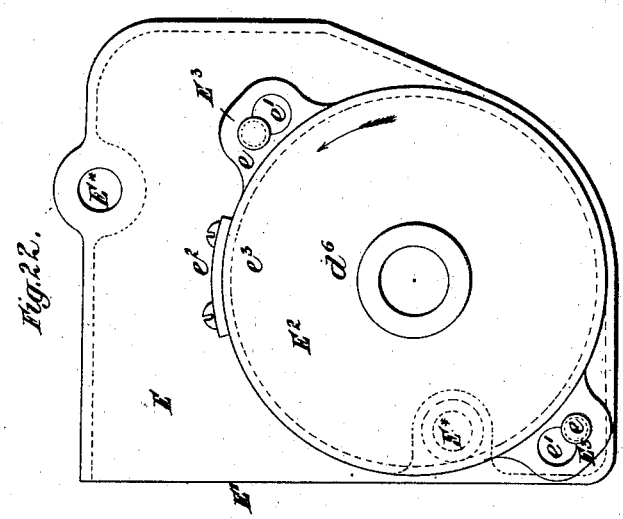
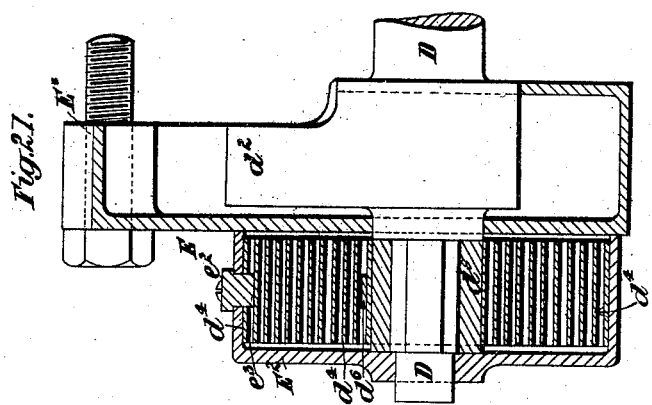

(No Model.) 24 Sheets—Sheet 21.
H. S. MAXIM.
AUTOMATIC BREECH LOADING GUN.

No. 453,702. Patented June 9, 1891.

(No Model.) 24 Sheets—Sheet 22.

H. S. MAXIM.
AUTOMATIC BREECH LOADING GUN.

No. 453,702. Patented June 9, 1891.

(No Model.)
24 Sheets—Sheet 23.
H. S. MAXIM.
AUTOMATIC BREECH LOADING GUN.
No. 453,702.　　　　　　　　Patented June 9, 1891.
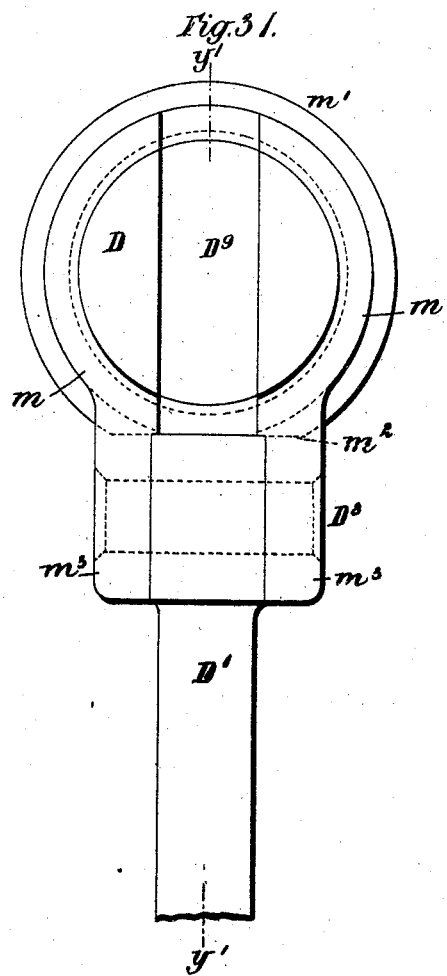

(No Model.)  24 Sheets—Sheet 24.
H. S. MAXIM.
AUTOMATIC BREECH LOADING GUN.
No. 453,702. Patented June 9, 1891.
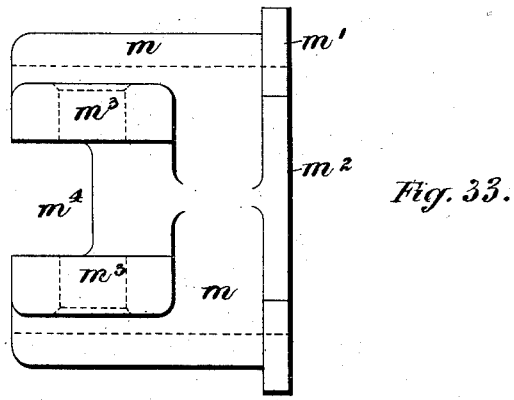
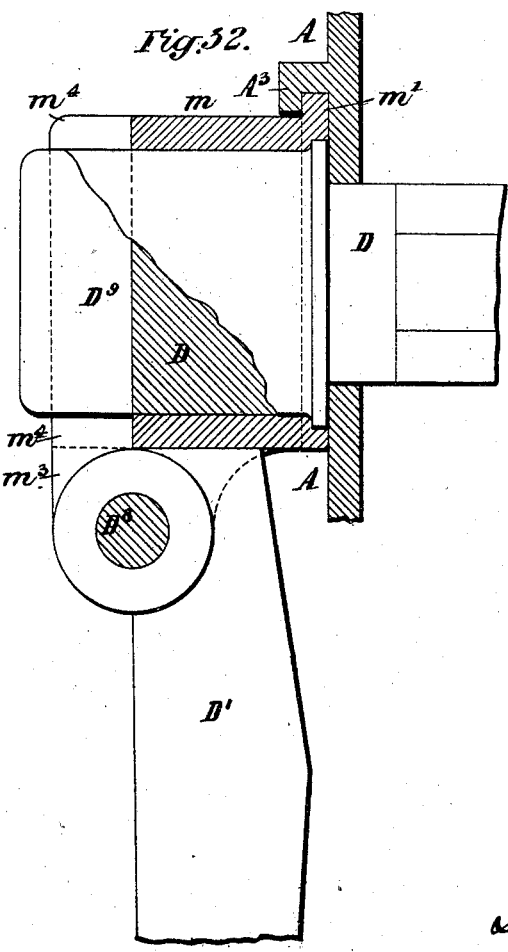

UNITED STATES PATENT OFFICE.

HIRAM STEVENS MAXIM, OF LONDON, ENGLAND, ASSIGNOR TO THE MAXIM GUN COMPANY, LIMITED, OF SAME PLACE.

AUTOMATIC BREECH-LOADING GUN.

SPECIFICATION forming part of Letters Patent No. 453,702, dated June 9, 1891.

Application filed September 8, 1888. Serial No. 284,871. (No model.) Patented in England March 30, 1887, No. 4,778.

*To all whom it may concern:*

Be it known that I, HIRAM STEVENS MAXIM, mechanical engineer, a citizen of the United States of America, and a resident of London, England, have invented new and useful Improvements in and Relating to Quick-Firing Guns and other Fire-Arms, (for which I have obtained a patent in Great Britain, No. 4,778, bearing date March 30, 1887,) of which the following is a specification, reference being had to the accompanying drawings.

This invention is an improvement in rapid-firing guns and other fire-arms.

The object of the invention is to construct a rapid-firing gun that shall be automatic in its action—that is to say, so that all or nearly all the operations necessary in loading, firing, extracting the empty cartridge-shells, and reloading will be performed by energy developed by the explosion of a cartridge in the barrel.

The main distinguishing feature of the gun or guns forming the subject of my present invention is a transversely-movable breech-block—that is to say, I have designed and organized a gun belonging to that general class now known as "automatic," in which the breech-block, in lieu of moving longitudinally or in line with the barrel, is moved by the action or as the result of the explosion of a cartridge in a direction transverse to the axis of the barrel to open and close the breech. This feature presents the specific advantage that by the employment of simple and efficient means the breech is or may be kept closed for a longer period after the explosion than in other forms of guns, whereby time is allowed for the escape of the gases from the muzzle of the gun before the empty cartridge-shell is extracted, so that there will be no escape of gases during or after the extraction thereof. This is especially advantageous in the case of guns for use with large cartridges, for if time is not allowed for the escape of the gases before the extraction of the empty shell there is not only an escape at the breech after such extraction, but the empty shell is liable to be injured and the chamber of the gun to become fouled to such an extent as to ultimately prevent the introduction of a loaded cartridge therein. The movement of the breech-block is effected through suitable devices, the operation of which is due to the movement of a recoiling portion of the gun relatively to a stationary part of the same. This movement may be imparted either during the direct recoil of said moving part or upon the return of the same by energy stored in mechanism provided for that purpose by its recoil, and in illustration of the general principle of my invention I have shown various modifications of mechanism which I have devised for carrying out my invention, but all of which involve the same general principles of construction and operation.

In the accompanying drawings I have shown how my said invention may be conveniently and advantageously carried into practice.

Figure 1:
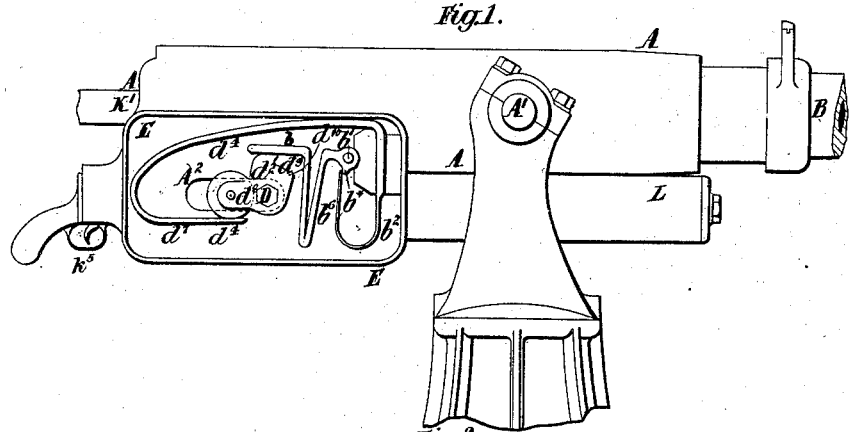
Figure 2:
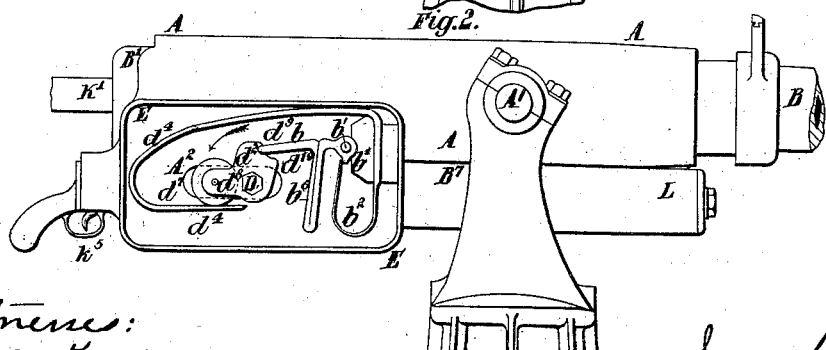
Figure 9:
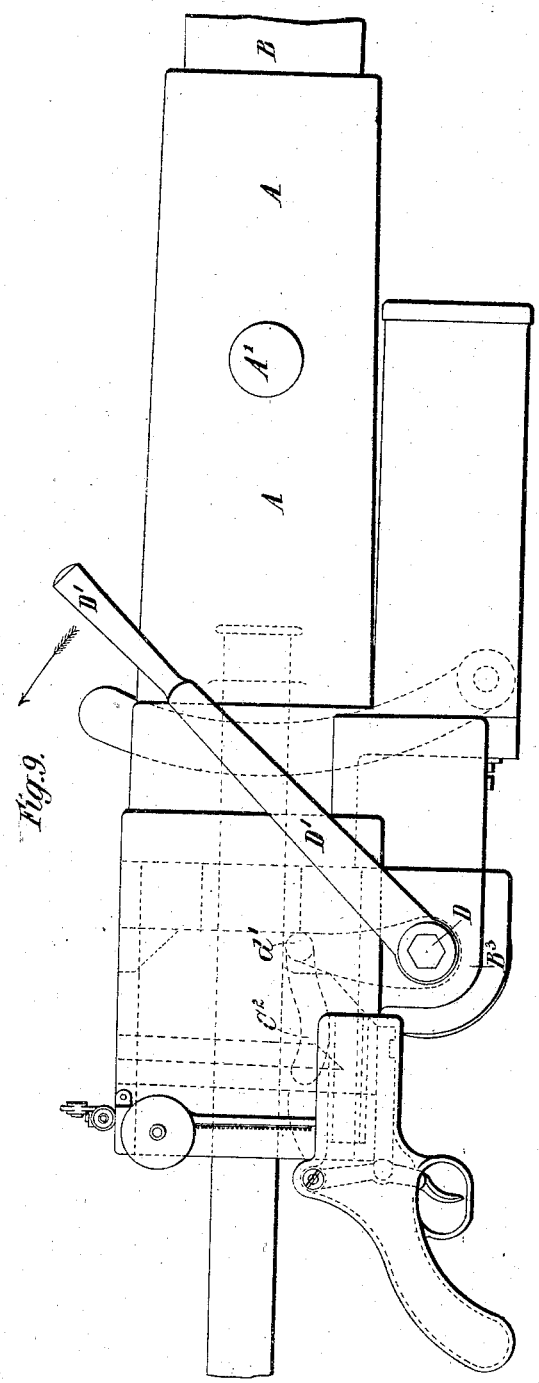
Figure 10:
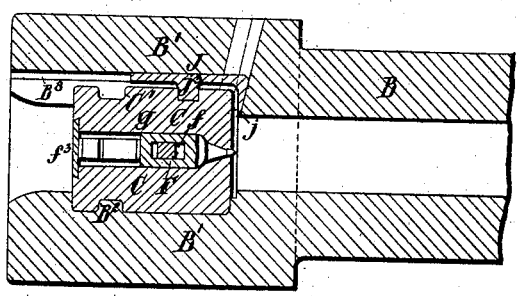
Figure 12:
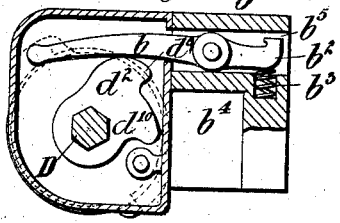
Figure 13:
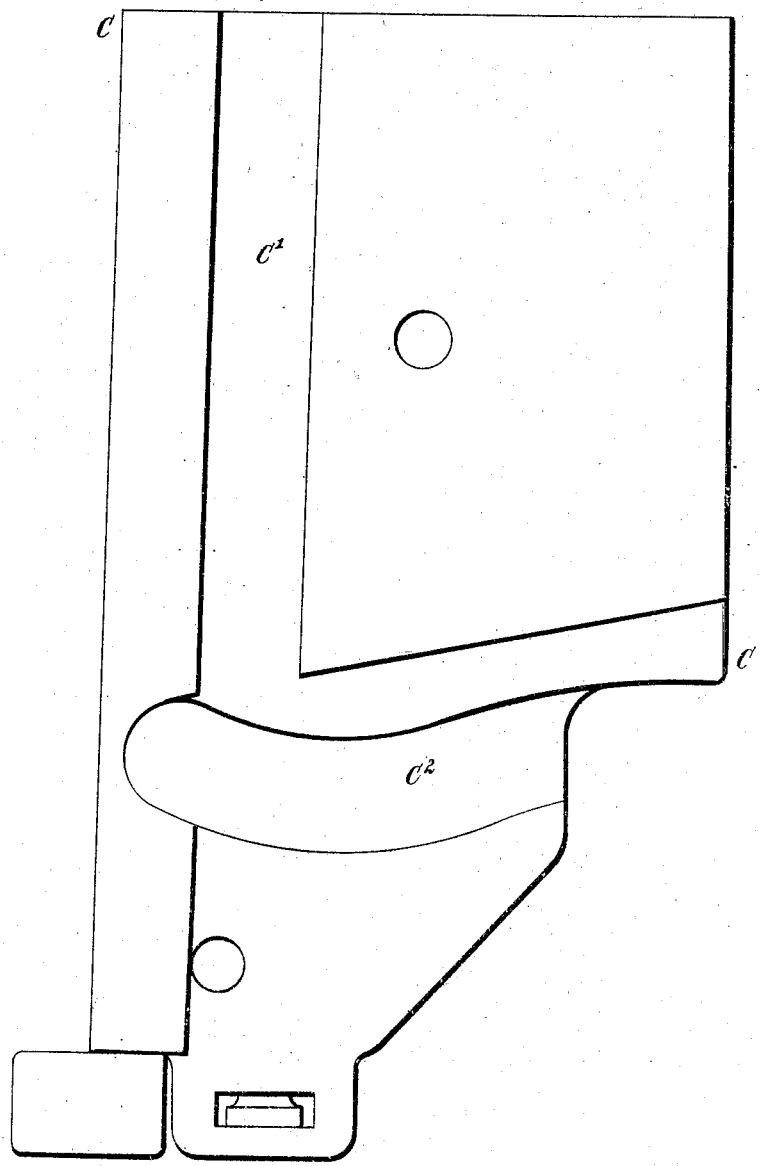
Figure 14:
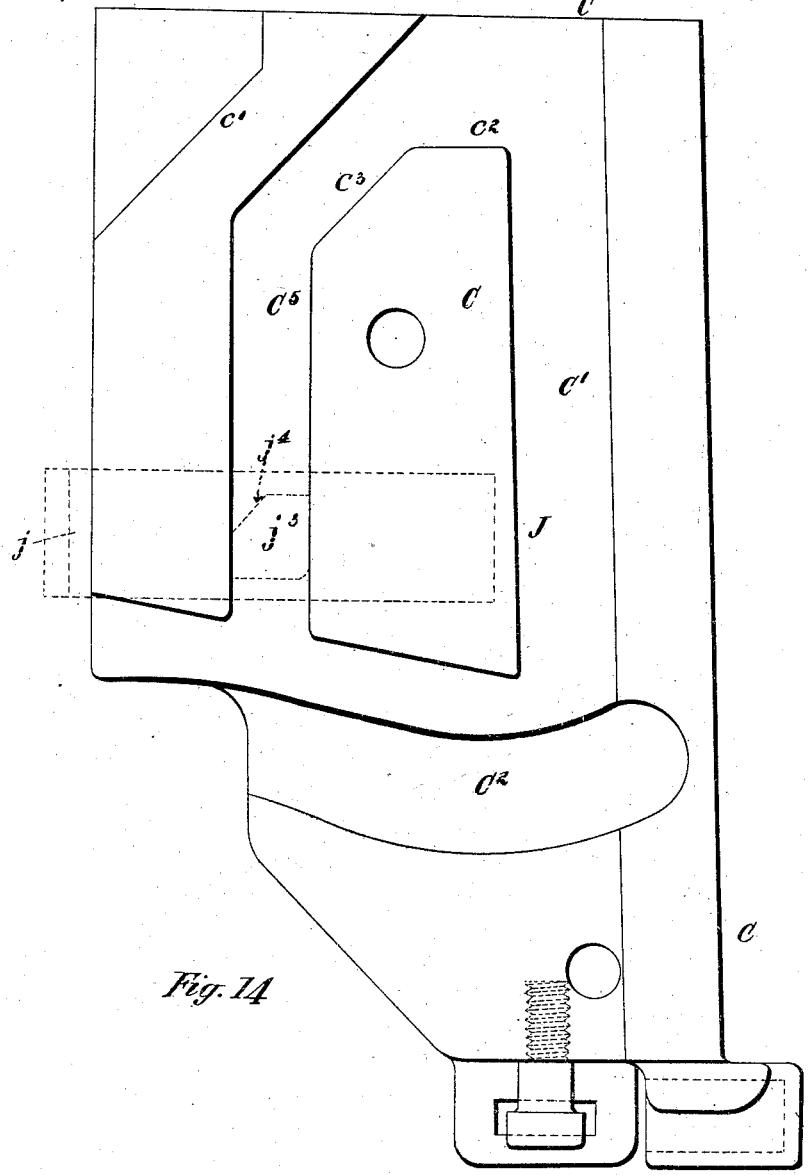
Figure 15:
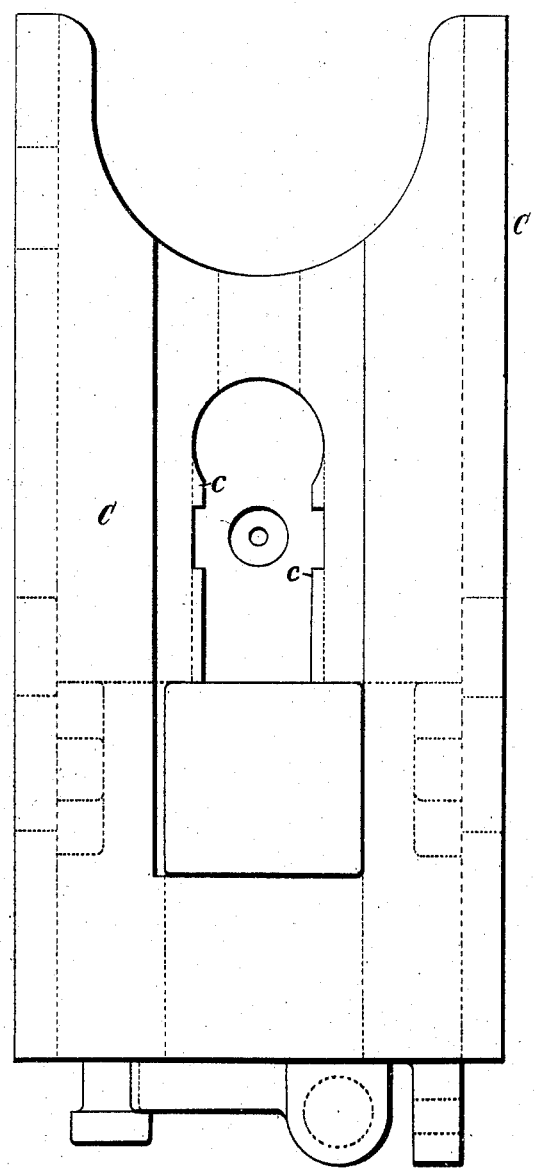
Figure 16:
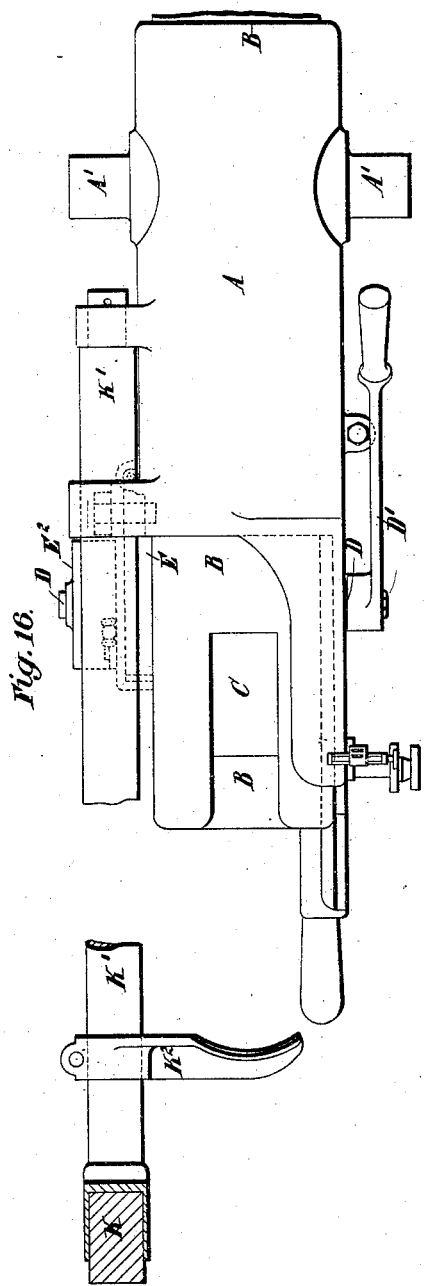
Figure 24:
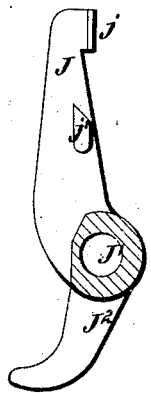
Figure 23:
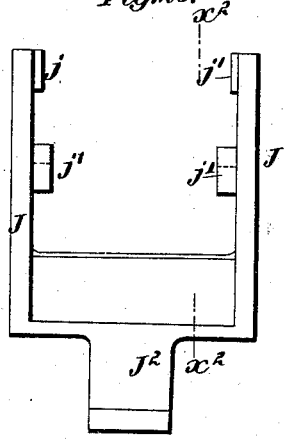
Figure 25:
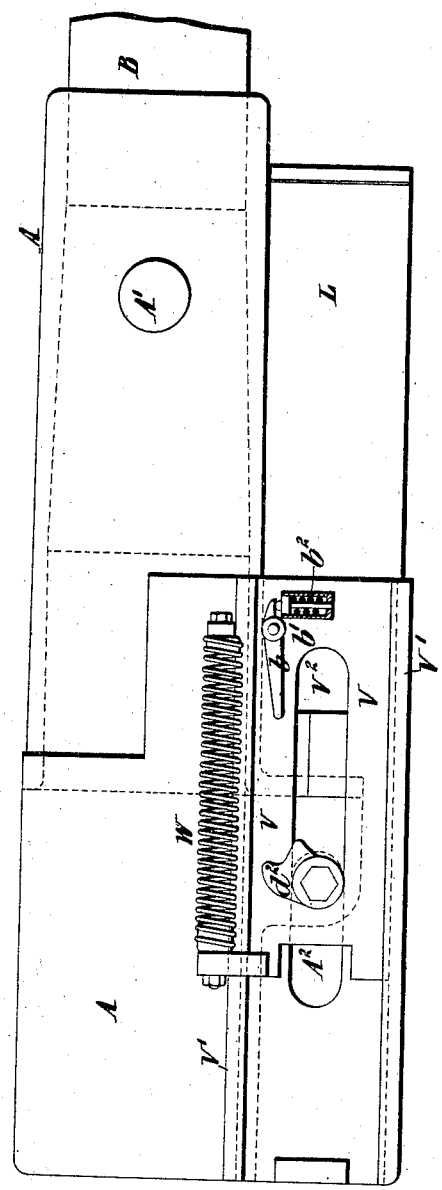
Figure 26:
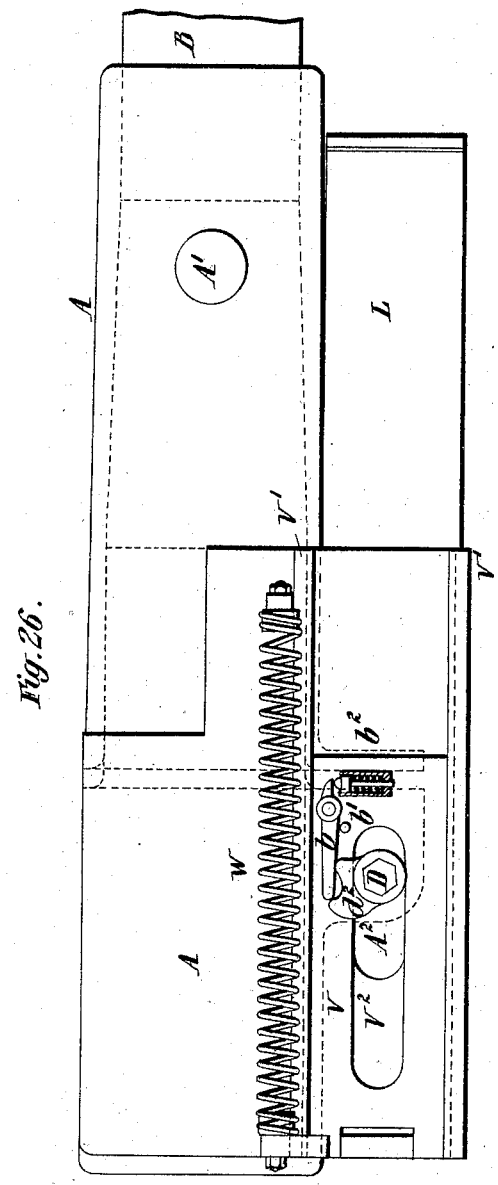
Figure 27:
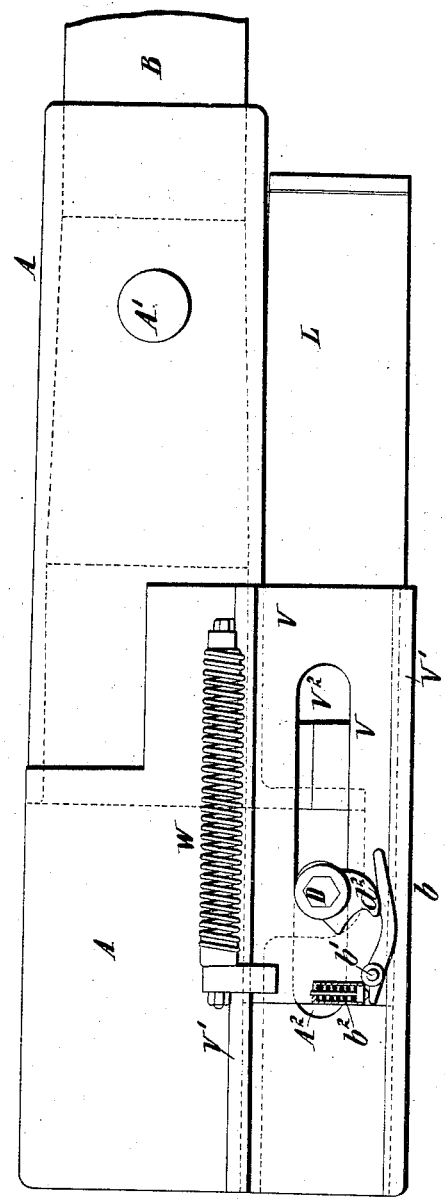
Figure 28:
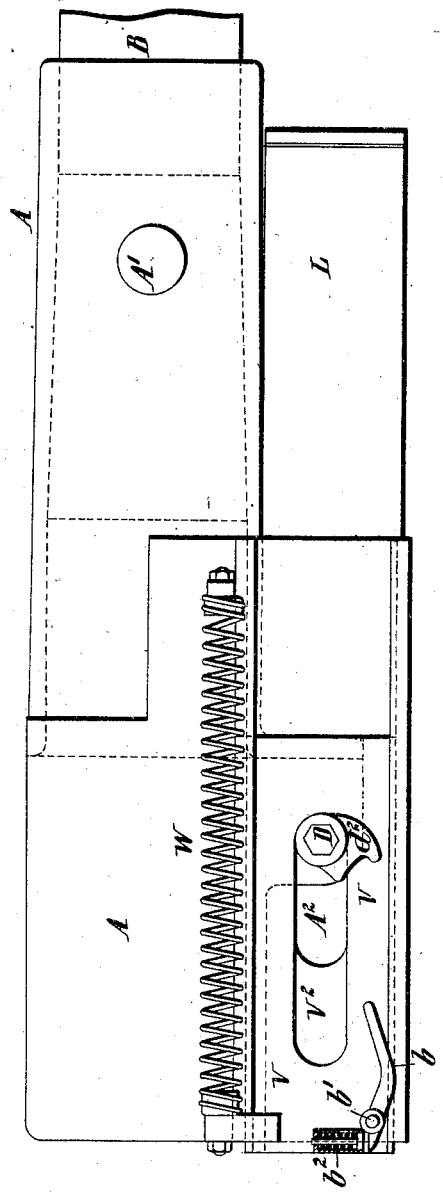
Figure 29:
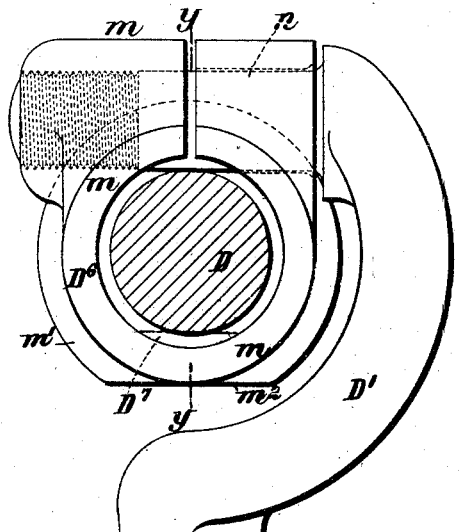

Figure 1 is a side elevation of one form of my improved quick-firing gun, showing the parts in the positions which they occupy when the gun is ready for firing, part of a casing, hereinafter referred to, being removed. Fig. 2 is a similar view showing the parts in the positions which they occupy after the gun has recoiled and has commenced its return movement. Fig. 3 is a similar view showing the parts in the positions which they occupy when the gun has returned to the firing position, a shoulder-piece or crutch, hereinafter described, for facilitating the pointing of the gun, being shown in longitudinal central section. Fig. 4 is a vertical longitudinal central section of the gun, showing the parts in the positions which they occupy when the gun has been fired and is about to recoil. Fig. 4ª is a sectional elevation, drawn to an enlarged scale, of the firing-pin or striker detached. Fig. 5 is a sectional side elevation showing the parts in the positions which they occupy when the gun, after recoiling, has returned to the firing position, the breech being open, ready for the insertion of a fresh cartridge. Fig. 6 is a sectional elevation showing details of construction. Fig. 7 is a plan, partly in horizontal section, illustrating a modification of my invention. Fig. 8 is a side elevation, partly in vertical central section, showing a cartridge-magazine combined with my improved gun, as hereinafter set forth. Fig. 9 is a side elevation of part of another quick-firing gun constructed according to my present invention. Fig. 10 is a horizontal central section, and Fig. 11 a vertical longitudinal central section, of same. Fig. 12 is a view showing details of construction. Fig. 13 is an elevation of the right-hand side, and Fig. 14 an elevation of the left-hand side, of the breech-block, both drawn to an enlarged scale. Fig. 15 is a rear elevation of the said block, also drawn to an enlarged scale. Fig. 16 is a plan, and Fig. 17 a side elevation, of part of another gun constructed according to my present invention. Fig. 18 is a horizontal central section, and Fig. 19 a vertical longitudinal central section, of the said gun. Fig. 20 is a transverse section on the line $x\ x$, Fig. 19. Fig. 21 is a transverse section on the line $x'\ x'$, Fig. 18, drawn to an enlarged scale; and Fig. 22 is a side elevation, also drawn to an enlarged scale, illustrating details of construction. Fig. 23 is a rear elevation, and Fig. 24 is a section on the line $x^2\ x^2$, Fig. 25, both drawn to an enlarged scale, showing the extractor detached. Figs. 25 and 26 are side elevations illustrating another modification of my said invention. Figs. 27 and 28 are side elevations illustrating a further modification thereof. Fig. 29 is a side elevation, partly in vertical section, and Fig. 30 an end elevation, partly in transverse section, on the line $y\ y$ of Fig. 29, illustrating improved means for connecting the hand-lever, hereinafter described, with the shaft for operating the breech-block. Fig 31 is a side elevation; Fig. 32, an end elevation, partly in section, on the line $y'$, Fig. 31; and Fig. 33, an under side view illustrating other means for connecting the said lever and shaft.

Referring to Figs. 1 to 5, A is the gun-frame, which is provided with trunnions A', whereby it may be supported in a suitable carriage or mounting.

B is the barrel, and C the breech-block.

The gun proper—that is to say, the barrel and breech mechanism—are arranged to slide longitudinally in the frame A. The barrel is provided at the breech end thereof with a slotted extension B', in which the breech-block C is fitted to slide up and down, as hereinafter described. The breech-block is guided in its vertical movement by projections C' formed thereon and fitting into corresponding recesses $B^2$ in the extension B' of the barrel.

A spring $B^3$ is arranged in combination with the frame A and barrel B, as hereinafter more fully described, so that it will be compressed during the recoil, and will then react to effect the forward or return movement of the barrel and breech-block.

D is a shaft which is supported in bearings $B^4$, formed on the under side of the barrel at the breech end thereof. The frame A is formed with a slot $A^2$ to permit the shaft D to move freely with the barrel and breech-block during the to-and-fro movement thereof. The shaft D has fixed thereon a lever $d$, having two arms connected by a pin or rod $d'$, which extends through slots $C^2$ in the breech-block C', so that when the shaft D is turned through an angle of about sixty degrees in the direction indicated by the arrow in Figs. 2 and 4 the pin $d'$ will move the breech-block downward and open the breech. The slots $C^2$ are shaped as shown in Figs. 4 and 5, the forward part thereof being concentric with the shaft D, so that the lever $d$ will have a small amount of lost motion therein, for the purpose hereinafter explained.

An arm $d^2$ is fixed on the shaft D, and a stop lever or pawl $b$ is pivoted at $b'$ to the frame A. When the parts are in the position shown in Figs. 1 and 4, the said lever or pawl $b$ rests upon the said arm $d^2$. The short arm $b^*$ of the lever or pawl $b$ is acted upon by a spring $b^2$, which is inclosed in a casing E, formed on or attached to the frame A, and which tends to slightly turn the said lever or pawl about its pivot at the termination of the recoil, so that in the forward or return movement of the barrel the arm $d^2$ will engage with the rear end of the lever or pawl $b$ and the shaft D will be partially rotated and the breech thus automatically opened. The lever $d$ is provided with a stop $d^3$, which will impinge against the projection $B^5$ on the barrel, and thus limit the downward movement of the breech-block.

$d^4$ is a bent spring which is secured to the frame A, and the free end of which acts upon a roller $d^7$, carried by a projection $d^8$ on the arm $d^2$, for the purpose hereinafter specified.

F is the firing-pin or striker, which is arranged to slide longitudinally between guides $c$ on the breech-block C, and is formed with a central slot $f$ and with shoulders $f'\ f^2$ on its under side. A spring $f^3$ bears against the rear end of the firing-pin, so that it will be compressed when the said firing-pin is cocked, and will subsequently react to fire the gun when the said firing-pin is released, as hereinafter described. A bent cocking-lever $g$ is pivoted at $g'$ to the breech-block C and extends downward through the slot $f$ in the firing-pin, the lower end extending into the path of the pin $d'$ of the lever $d$.

$h$ is a hooked lever or sear which is pivoted at $h'$ to the breech-block C, and which, when the firing-pin is cocked, engages with the shoulder $f'$. A lever $h^4$ is formed integrally with the said sear, and is designed to be actuated by a trigger $h^5$, connected with the said lever $h^4$, or the said lever may be actuated by a lanyard attached to its lower end, or by other suitable means for the purpose of disengaging the said sear from the firing-pin.

To prevent the pulling of the trigger to fire the gun before the breech-block is in its firing position, a safety-sear $i$ is pivoted at $i'$ to the breech-block, and is acted upon by a spring $i^2$, whereby it is caused to engage with the shoulder $f^2$ on the firing-pin when the said firing-pin is cocked. This sear is arranged to be released automatically by means of the pin $d'$, as hereinafter described.

J is a forked extractor, each arm of which is formed with a lip $j$, adapted to engage with one side of the flange of a cartridge in the barrel. The said extractor is pivoted at $J'$ to the breech end of the barrel and is provided with an arm $J^2$, which projects beneath the breech-block, so that when the latter is moved down to open the breech the said block will act upon the said arm $J^2$ and turn the extractor about its pivot $J'$ to extract the empty cartridge-shell from the barrel. The extractor J is provided with projections $j'$, adapted to engage with a recess $C^3$ in the top of the breech-block for the purpose of holding down the said block until released by the insertion of a fresh cartridge, as hereinafter described.

To provide for facilitating the pointing of the gun, and for retaining the same in any position to which it may be turned about its trunnions, and thus preventing displacement of the gun by the preponderance of the breech, a crutch or shoulder-piece K is used in combination with a locking device. This crutch or shoulder-piece is pivoted at $K^2$ to a frame $K^3$, formed or fixed on a tubular rod $K'$, which is firmly secured at its forward end to the frame A. A lever $k$ is pivoted at $k'$ to the frame $K^3$, and the short arm of the said lever is coupled to one end of a rod $k^2$, extending through the hollow rod $K'$. The other end of the rod $k^2$ is adapted to engage with a toothed or serrated segment $k^3$, Fig. 6, pivoted at $k^*$ to the gun-mounting. The long arm of the lever $k$ is acted upon by a spring $k^4$, which tends to hold the parts in the positions shown, so that the gun cannot turn upon its trunnions. When it is desired to elevate or depress the gun, the gunner can, by pressing his shoulder against the crutch K, turn the lever $k$ upon or about its pivot K, and draw the rod $k^2$ backward out of engagement with the segment $k^3$. As soon as the crutch K is released the spring $k^4$ will cause the rod $k^2$ to again engage with the said segment.

L is a hydraulic cylinder, which is secured to the frame A, and in which works a piston $L'$, the rod $L^2$ whereof works through a stuffing-box $l$ at the end of said cylinder. This device constitutes a brake for controlling the recoil of the gun and its return to the firing position. The piston-rod is firmly secured at its rear end to the projection or lug $B^5$ on the breech end of the barrel, and is provided with a collar $L^3$, which bears against a shoulder thereon. This collar connects the said piston-rod with the spiral spring $B^3$, which surrounds the said rod and bears at its rear end against a cap $B^6$, fixed in the end of a casing $B^7$, which incloses the spring $B^3$.

The cylinder L is provided with an aperture or passage $l'$ to permit the introduction into the same of water or other liquid. The bore of the said cylinder is tapered from the forward to the rear end thereof—that is to say, the forward end is made larger in diameter than the rear end thereof. In the recoil the liquid in the cylinder L will be forced from the rear to the front of the piston through the space between the said piston and the sides or walls of the cylinder, thus diminishing the force of the recoil. The piston $L'$ is perforated and provided with a valve $L^3$, which is connected with rod $L^2$ by a pin $l^2$, extending into a slot in the said rod. This valve is closed during the recoil and opens to permit the return of the gun to the firing position under the action of the spring $B^3$.

The operation of my improved gun, constructed as hereinbefore described with reference to Figs. 1 to 5, is as follows—that is to say: The parts are shown in Fig. 4 in the positions which they occupy when the gun has been fired and is about to recoil in the frame A. The force and velocity of the recoil are regulated or controlled by the spring $B^3$ and by the piston $L'$, working in the hydraulic cylinder L. At the termination of the recoil the stop lever or pawl falls in front of the hook or projection $d^9$ on the arm $d^2$, and in the forward or return movement of the gun the said hook engages with the extremity of the said lever or pawl, whereby the shaft D is turned upon or about its axis in the direction indicated by the arrow in Figs. 2 and 4, and the spring $d^4$ is bent down into the shape shown in Fig. 3. The stop lever or pawl $b$ is shown made with a spring $b^6$, which is first compressed, as shown in Fig. 2, and then reacts or expands. The compression of this spring prevents any jar or shock and insures a gradually-increasing velocity of movement of the shaft D about its axis. In the first part of the forward movement of the gun no motion is imparted to the breech-block, the pin $d'$ moving in the concentric part of the slots $C^2$. In the continued movement of the gun the firing-pin is drawn back by means of the lever $g$, the safety-sear $i$ being at the same time set free, so that it springs into engagement with the shoulder $f^2$ on the firing-pin F. The sear $h$ also engages with the shoulder $f'$ on the said firing-pin, which is thus retained in its cocked position. The breech-block is then moved down, and, acting upon the tail-piece $J^2$ of the extractor, effects the extraction and ejection of the empty cartridge-shell. The further downward movement of the breech-block is prevented by the contact of the stop $d^3$ with the projection $B^5$ on the barrel, and the said block is held down by the engagement of the projections $j'$ on the extractor J with the notch or recess $C^3$ in the top of the said block. At the termination of the forward or return movement of the barrel and breech-block the projection $d^{10}$ on the arm $d^2$ strikes the stop-lever $b$ and disengages the same from the hook $d^9$, as shown in Fig. 3. The gun is now ready to receive another cartridge, the flange of which, upon the said cartridge being forcibly inserted into the barrel by hand, strikes the lips $j$ of the extractor J, and thus releases the breech-block from the projections $j'$ and forces the said extractor into the recesses provided therefor in the breech end of the barrel. The spring $d^4$ then reacts upon the arm $d^2$, thus raising the breech-block and closing the breech. During the latter part of the upward movement of the breech-block the pin $d'$ strikes the lower arm of the safety-sear $i$ and disengages it from the shoulder $f^2$ of the firing-pin F. The gun is now ready to be fired by hand by means of the trigger or equivalent device.

In starting the gun, when the breech is closed and there is no cartridge in the barrel, it is necessary to open the breech by hand. This operation is effected by applying a hand-lever to one end of the shaft D and turning the said shaft through an angle of about sixty degrees in the direction indicated by the arrow in Figs. 2 and 4.

It will be seen that the gun above described operates automatically in respect of the opening of the breech, the extraction of the empty cartridge-shell, and the cocking of the gun—that is to say, all the operations, with the exception of the insertion of the cartridges into the barrel and the releasing of the firing-pin or striker, are automatically performed. By fixing the trigger in the firing position the gun may be rendered strictly automatic, with the exception of the insertion of the cartridges into the barrel.

In making a gun for use with large and heavy cartridges I sometimes provide for the automatic insertion of the cartridges into the barrel. In Fig. 7 I have illustrated apparatus designed for this purpose. R is a tube or sleeve which is fitted to slide longitudinally upon the rod K' of the shoulder-piece K. A spring S is placed upon the said rod between the said shoulder-piece K and a shoulder R' on the interior of the tube or sleeve R, and is inclosed or partly inclosed by the said sleeve. The sleeve R is provided with a stud or projection $R^2$, and a corresponding stud or projection $B^9$ is formed on the barrel B. A lever or catch T is pivoted at T' to the tube or sleeve R and is acted upon by a spring $T^2$, which causes or tends to cause the said catch to engage with a shoulder $k^5$ on the rod K' when the sleeve R is in its rearmost position, as shown. A bracket $R^3$ is formed on or attached to the tube or sleeve R. This bracket is adapted to receive the base or rear end of a cartridge when the latter is placed in position for thrusting into the barrel. The rear end of the catch or lever T extends along one side of the bracket $R^3$, so that when a cartridge is placed upon the said bracket the said cartridge will disengage the said catch upon the shoulder $k^5$.

The operation of the apparatus shown in Fig. 7 is as follows—that is to say, in the recoil the projection $B^9$, acting upon the projection $R^2$, drives the sleeve R backward upon the rod K', thus compressing the spring S until the catch T engages with the shoulder $k^5$ and holds back the sleeve R, keeping the said spring compressed. To load the gun it is only necessary to drop the cartridge into the slot in the breech of the gun and into the bracket $R^3$. The flange of the said cartridge then strikes the catch T and turns the same upon its pivot, thus disengaging it from the shoulder $k^5$. The spring S then reacts and pushes forward the sleeve R, thereby thrusting the cartridge into the barrel of the gun.

To facilitate the charging of the gun, I prefer to arrange upon the gun-mounting a magazine or holder for the cartridges, from which the said cartridges can be readily lifted or withdrawn by hand, one by one, for placing in the gun or for dropping into position to be thrust into the barrel by the spring S, as above described. In Fig. 8, U is a cartridge holder or magazine which is attached to the swelling part of the gun-mounting, so that it extends below and at one side of the breech of the gun. A suitable spring U' is arranged in the said magazine for elevating the cartridges thereon, and the magazine is provided at its upper end with spring-fingers $u$ for retaining the cartridges thereon, while permitting their withdrawal therefrom, as required.

In the modification of my invention shown in Figs. 9 to 15 the breech-block is guided in its vertical movement by projections $B^2$, formed on the inside of the slotted extension B' and fitting into corresponding recesses C' in the breech-block C. Strong involute springs $B^3$ are arranged with the hydraulic recoil-brake cylinder L, so that they will be compressed during the recoil and will then react to effect the forward or return movement of the barrel. The shaft D is provided with a lever D' for opening the breech by hand, and with a forked lever $d$, the arms or ends of which are provided with pins or projections $d'$, working in slots $C^2$ in the breech-block C, so that when the lever D' is turned through the required angle in the direction indicated by the arrow in Fig. 9 the pins $d'$ will move the breech-block downward and open the breech, substantially as above described. The short arm $b^2$ of the stop lever or pawl $b$ is acted upon by a spring $b^3$, which is inclosed in a casing $b^4$, formed on or attached to the frame A, and which tends to turn the said lever about its pivot at the termination of the recoil. A stop or projection $B^5$ is formed on the casing $b^4$ to limit the downward movement of the lever or pawl $b$. The shaft D is provided with a flat portion $D^2$, against which the breech-block C in its downward movement will impinge. The downward movement of the breech-block is thus limited. The arm or cam $d^2$ on the shaft D is inclosed by a casing, which is secured to the barrel by suitable screws, and the lever or pawl $b$ works in a slot or aperture formed in this casing. The shaft D is provided with a coiled spring, which is wound up during the opening of the breech and then reacts to close the said breech, as hereinafter more fully described with reference to Figs. 16 to 24. The said spring is inclosed in a separate casing secured to the casing around the cam $d^2$ by means of screws or other fastenings. $d^{11}$ is a lever formed or fixed on the shaft B and adapted to engage with the end of the cocking-lever $g$. $g^*$ is a bent lever or sear pivoted at $g^4$ to the breech-block and provided with a downwardly-projecting arm $g^2$, which is connected by suitable levers to the trigger. The sear $g^*$ is so arranged that when in the backward movement of the gun the shaft D is turned about its axis the lever $d^{11}$ will move the cocking-lever $g$ backward into engagement with the said sear. A spring $g^3$ acts upon the downwardly-projecting arm $g^2$ of the sear $g^*$ and holds the said sear in engagement with the lever $g$ until released by the pulling of the trigger. The extractor J is arranged to slide in a longitudinal slot $B^8$ in the breech end of the barrel and is provided with a lug or projection $j^3$, which fits into a groove or recess $C^5$ in the breech-block C. The said projection $j^3$ is provided with an inclined face $j^4$, for the purpose hereinafter explained. The groove or recess $C^5$ is made of the shape shown in Fig. 14, so that when the breech-block moves down the inclined face $j^4$ on the projection $j^3$ rides along the inclined face $c'$ of the breech-block, thereby drawing the empty cartridge-case from the barrel. The face $c^2$ then comes in contact with the under side of the lug or projection $j^3$, which will thus act as a stop to prevent the further upward movement of the breech-block until released, as herein described. Upon the insertion of a fresh cartridge the flange thereof will strike against the lip $j$ of the extractor and will move the lug or projection $j^3$ out of engagement with the horizontal face $c^2$ and onto the inclined face $c^3$. The pressure of the coiled spring acting upon the breech-block will then cause the said block to move upward, and the said lug or projection sliding on the inclined face $c^3$ the extractor will be moved back.

Figure 17:
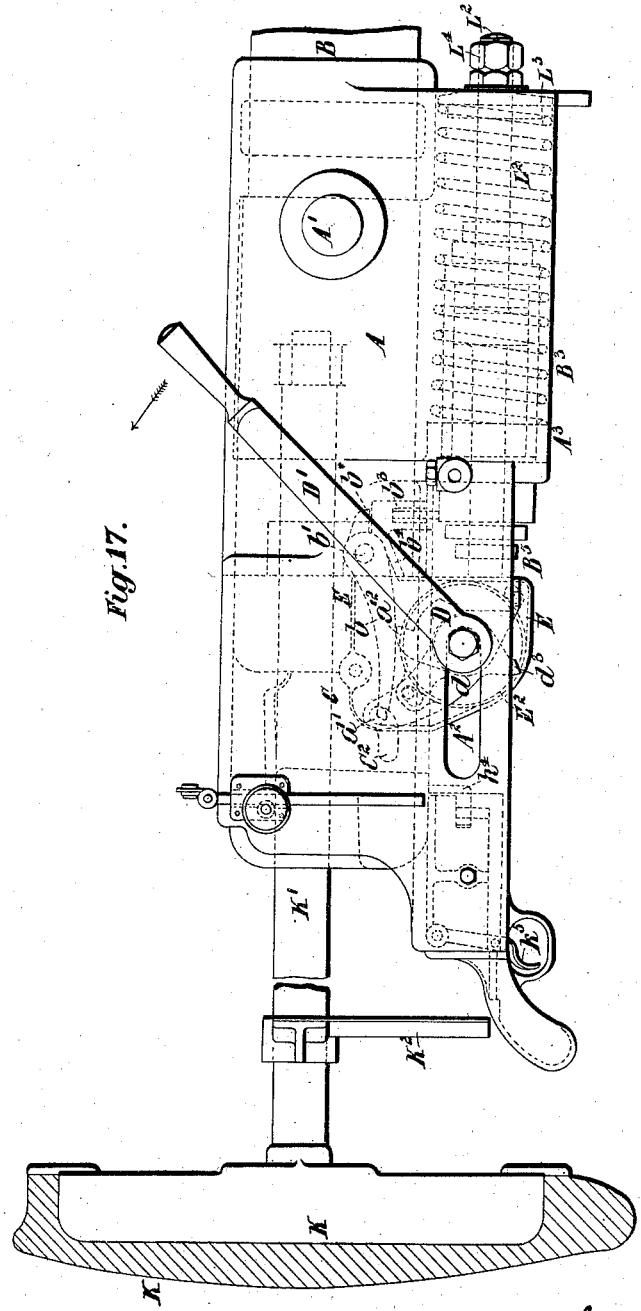
Figure 18:
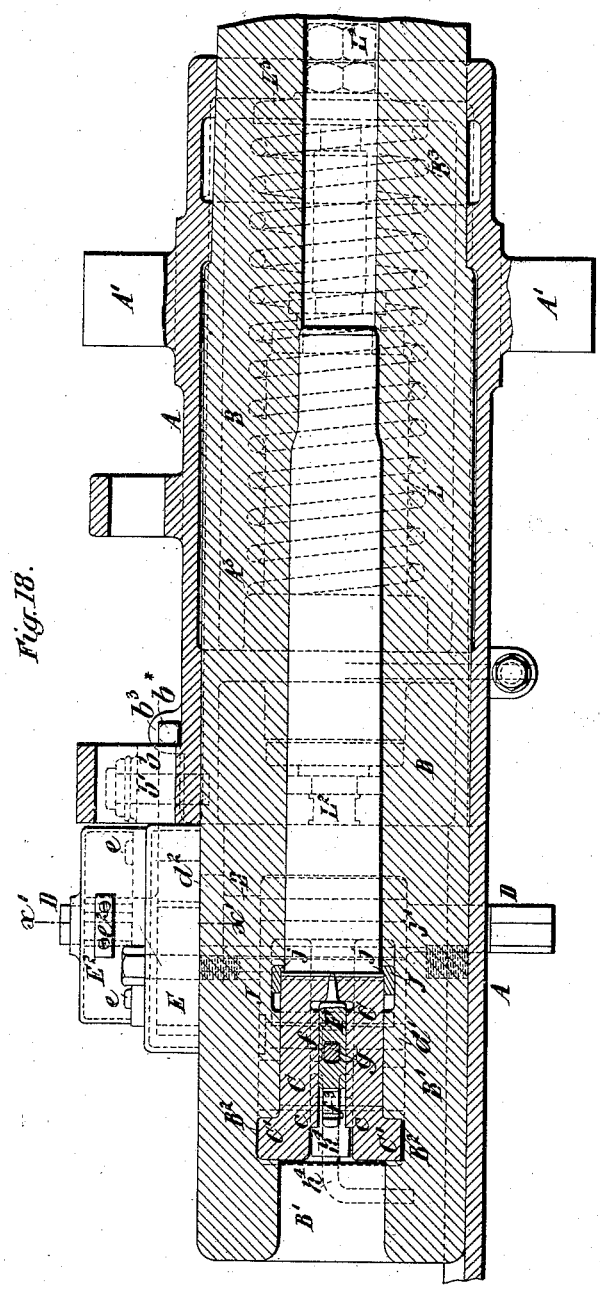
Figure 19:
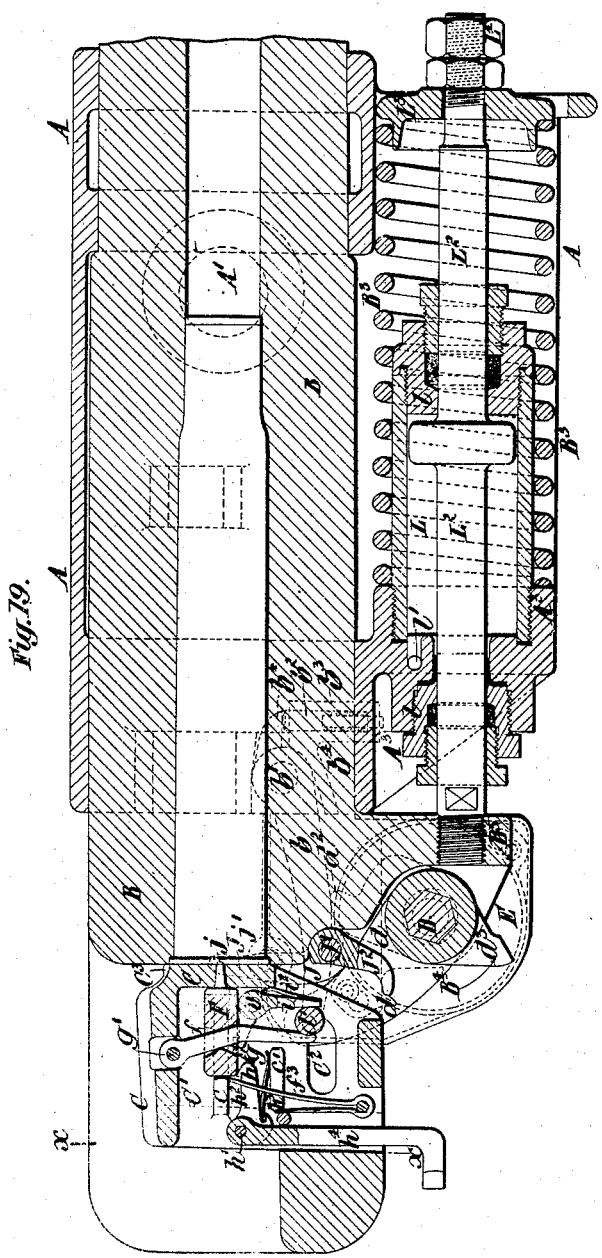
Figure 20:
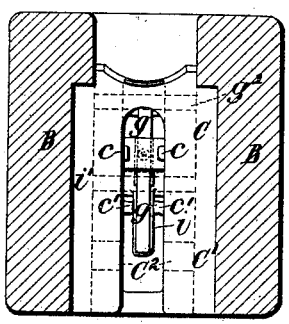

In the gun shown in Figs. 16 to 24 the shaft D is provided with a lever D′ for opening the breech by hand, and with a forked lever $d$, in which is fixed a pin $d'$, connecting the two arms of the said forked lever and engaging in slots $C^2$ in the breech-block C′, so that when the lever D′ is turned through an angle of about sixty degrees, as above described, the pin $d'$ will move the breech-block downward and open the breech. A stop or projection $b^4$ is formed on the casing $b^3$ to limit the downward movement of the lever or pawl $b$. The forked lever $d$ is, moreover, provided with a stop $d^3$, which will impinge against the projection $B^5$ on the barrel, and thus limit the downward movement of the breech-block. The arm $d^2$ on the shaft D is inclosed by a casing E, which is secured to the barrel B by screws passed through holes $E^*$ in the casing E. (See Fig. 24.) The lever or pawl $b$ works in a slot or aperture E′, formed in the casing E. The shaft D is provided with a coiled spring $d^4$, one end whereof is attached to a hook $d^6$ on a bush or sleeve $d^5$, secured on the shaft D, so that it will rotate therewith. The said spring $d^4$ is inclosed in a casing $E^2$, secured to the casing E by means of screws $e$, passed through elongated slots $e'$ in lugs $E^3$, formed on the said casing $E^2$. The casing $E^2$ is provided with a plate $e^2$, having formed or fixed thereon a hook $e^3$, to which is attached the outer end of the coiled spring $d^4$. The slots $e'$ are enlarged at one end, as shown, so that to remove the casing $E^2$, spring $d^4$, and bush or sleeve $d^5$ it is only necessary to turn the said casing through a small angle in the direction indicated by the arrow in Fig. 24 and then draw the said casing away from the casing E, the larger parts of the slots $e'$ passing easily over the heads of screws $e$. It will be seen that the coiled spring $d^4$ will tend to move the casing $E^2$ in the reverse direction to that indicated by the arrow, and thus keep the narrow parts of the slots $e'$ in engagement with the screws $e$. The casing $E^2$ and parts connected therewith will therefore be held firmly in position upon the casing E. The sear $h$ is pivoted at $h'$ to the breech-block C, and is forked, as shown in Fig. 18, the arms thereof being provided with shoulders $h^2$, which when the firing-pin is cocked engage with the shoulders $f'$. Springs $h^3$ are secured at one end to the said sear, and bear at their other ends upon projections $c'$ on the breech-block, so that they tend to press the shoulders $h^2$ into engagement with the shoulders $f'$. A lever $h^4$ is formed integrally with the said sear and is designed to be actuated by a trigger $h^5$, connected with the said lever $h^4$, as shown in Fig. 17, or the said lever may be actuated by a lanyard attached to its lower end, or by other suitable means, for the purpose of disengaging the said sear from the firing-pin. To provide for facilitating the pointing of the gun, a crutch or shoulder-piece K is attached to one end of the rod K′, the other end of which is firmly secured to the frame A. To prevent injury to the gunner by the empty cartridge-shell when ejected from the gun by the extractors J, a guard-plate $K^2$ is so attached to the rod K′ that it may be adjusted thereon to any suitable position and secured by means of bolts or otherwise. The hydraulic cylinder L is secured to a strong bracket or lug $A^3$ on the frame A. The piston-rod $L^2$ works through stuffing-boxes $l$ at both ends of the said cylinder, and is firmly secured at its rear end to the projection or lug $B^5$ on the breech end of the barrel, and is provided at its forward end with a cap or collar $L^3$, secured thereon by means of locking-nuts $L^4$. This cap or collar connects the said piston-rod with the spiral spring $B^3$, which surrounds the cylinder L and bears at its rear end against the bracket or lug $A^3$. The cylinder L is provided with an aperture or passage $l'$ to permit the introduction into the same of water or other liquid. The bore of the said cylinder is tapered from the rear to the forward end thereof—that is to say, the forward end is made larger in diameter than the rear end thereof. In the recoil the liquid in the cylinder L will be forced from the rear to the front of the piston through the space between the said piston and the sides or walls of the cylinder, thus diminishing the force of the recoil.

The operation of the gun shown in Figs. 16 to 24 is as follows—that is to say, the parts are shown in the positions which they occupy when the gun has been fired and is about to recoil in the frame A. The force and velocity of the recoil are regulated or controlled by the spring $B^3$ and by the piston $L'$, working in the hydraulic cylinder L. At the termination of the recoil the stop lever or pawl $b$ falls in front of the arm $d^2$, and in the forward or return movement of the gun the arm $d^2$ strikes against the extremity of the said lever or pawl, whereby the shaft D is turned upon or about its axis in the direction indicated by the arrow in Fig. 21. In the first part of this movement no motion is imparted to the breech-block, the pin $d'$ moving in the concentric part of the slots $C^2$. In the continued movement of the shaft D the firing-pin is drawn back by means of the lever $g$, the safety-sear $i$ being at the same time set free, so that it springs into the recesses $f^2$ in the firing-pin F. The sear $h$ also engages with the recesses $f'$ in the said firing-pin, which is thus retained in its cocked position. The breech-block is then moved down and engages with the tail end $J^2$ of the extractor, so that the latter is actuated to extract and eject the empty cartridge-shell. The further downward movement of the breech-block is prevented by the contact of the stop $d^3$ with the projection $B^5$ on the barrel, and the said block is held down by the projections $j'$ on the extractor J engaging in the recess $C^3$ in the top of the said block. The gun is now ready to receive another cartridge, the flange of which, upon the said cartridge being forcibly inserted into the barrel by hand, strikes the lips $j$ of the extractor J, and thus releases the breech-block from the projections $j'$ and forces the said extractor into the recesses provided therefor in the breech end of the barrel. The coiled spring $d^4$ then reacts upon the lever $d$, which raises the breech-block and closes the breech. During the latter part of the upward movement of the breech-block the pin $d'$ strikes the lower arm of the safety-sear $i$ and disengages it from the recess $f^2$ in the firing-pin F. It is obvious that at the termination of the forward or return movement of the barrel and breech-block the arm $d^2$ will be beneath the stop-lever $b$. The said arm when partially rotated by the spring $d^4$, as above described, will therefore raise the said stop-lever. The gun is now ready to be fired by hand by means of the trigger or equivalent devices. In starting the gun when the breech is closed and there is no cartridge in the barrel it is necessary to open the breech by hand. This operation is effected by turning the lever $D'$ through an angle of about sixty degrees in the direction indicated by the arrow in Fig. 17.

In Figs. 25 and 26 I have shown a modification of my invention wherein I pivot the stop lever or pawl $b$ to a heavy block or weight V, fitted to slide between guides $V'$, formed on or attached to the frame A. The weight V is formed with a slot $V^2$, corresponding with the slot $A^2$ in the said frame, and the shaft D extends through the said slots, the arm $d^2$ being fixed on the said shaft outside of the said weight. A spring W is connected at one end to the frame A and at its other end to the weight V. In the recoil of the gun the shaft D, acting upon the weight V at the rear end of the slot therein, moves the weight rapidly backward, so that it expands the spring W and assumes the position shown in Fig. 26. The pawl $b$ in this movement acts upon the arm $d^3$ in the manner hereinbefore described, and thus opens the breech. The spring W then reacts and moves forward the weight V, ready for the next discharge. The breech is closed upon the insertion of the cartridge into the barrel, as hereinbefore described.

In the modification of my invention shown in Figs. 27 and 28 I also employ a weight arranged to slide in guides $V'$ on the frame A, substantially as described with reference to Figs. 25 and 26. In this modification, however, the stop lever or pawl $b$ is placed behind the shaft D, and the said pawl and the arm $d^2$ are inverted, so that the opening of the breech will be effected in the forward or return movement instead of in the backward movement of the weight V. It is obvious that, if desired, the position of the stop lever or pawl $b$ may, in any of the arrangements shown, be reversed and the parts so constructed and arranged that the breech will be opened in the recoil instead of in the forward or return movement of the gun. It is obvious, moreover, that the spring for effecting the return of the gun to the firing position after its recoil may be arranged otherwise than as above described, and, if desired, two or more springs may be used for this purpose; also that any other brake or controlling device may be substituted for those above described.

In some instances I provide means for connecting the hand-lever $D'$ with the shaft D in such a manner that it can be readily disconnected therefrom to permit the movement of the said shaft independently of the lever, and connected therewith to permit the operation of the breech mechanism by hand, and so that the said lever can be readily applied to and removed from the said shaft.

Figure 30:
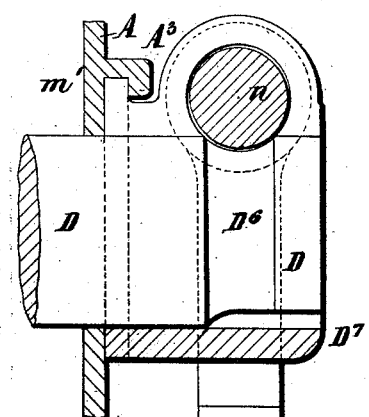

In Figs. 29 and 30, $m$ is a slit or divided collar, sleeve, or clip, which is fitted upon the shaft D, and may be clamped tightly thereon, as hereinafter described. The lever $D'$ is formed with a screw-stud $n$, which passes through one part of the collar or clip $m$ and is screwed into the other part thereof. The shaft D is formed with a circumferential groove $D^6$, through which the said stud passes, so that the said lever, while free to rotate upon the shaft, is securely retained thereon. The collar or clip $m$ is, moreover, formed with a flange $m'$, which engages with a flanged rib $A^3$ on the gun-frame A, and thus assists in retaining the said lever upon the shaft while permitting its rotation thereon. When the lever is in the position shown, the shaft can be operated automatically, as hereinbefore described, without affecting the said lever. If it is desired to operate the breech mechanism by hand, the lever $D'$ can be firmly fixed upon the shaft D by turning the said lever about the axis of the stud $n$ through an angle of about one hundred and eighty degrees in the direction indicated by the arrow in Fig. 30. To facilitate the application of the lever to the shaft and its removal therefrom, a flat surface $D^7$ is formed on the shaft D and a flat surface $m^2$ is formed on the flange $m'$. By turning the said lever upon the shaft from the position shown through an angle of about one hundred and eighty degrees the stud $n$ will be released from the groove $D^6$ and the flange $m'$ from the flange-rib $A^3$, so that the lever and collar or clip $m$ can be drawn off the shaft D. The said lever and collar can be placed and secured upon the shaft by the reverse of these operations. When the lever and collar or clip are removed, the shaft D can be withdrawn, and the breech-block C will then fall out of the breech-chamber. It will be seen, however, that when the lever is freely suspended from the shaft the said shaft and lever are securely held in place by the aforesaid devices.

In Figs. 31, 32, and 33 the lever D is pivoted at $D^8$ to lugs $m^3$, formed on the collar or sleeve $m$. The said collar or sleeve is made with a transverse slot or groove $m^4$ and the shaft D is made with a corresponding slot or groove $D^9$, so that by turning the lever upon or about its pivot $D^8$ in the direction indicated by the arrow in Fig. 32 through an angle of about one hundred and eighty degrees the said lever and collar or sleeve may be firmly connected with the shaft D. By turning the said lever and collar or sleeve upon the said shaft D from the position shown through an angle of about one hundred and eighty degrees they will be released so that they can be drawn off the shaft. The shaft can then be withdrawn, as described.

What I claim is—

1. In a machine-gun, the combination, with a fixed support and a barrel movable longitudinally therein, of a breech-block movable at right angles to the axis of the barrel for opening and closing the same, breech mechanism connected therewith and carried by the barrel, and a fixed stop or point of resistance adapted to engage with the breech mechanism on the forward or return movement of the same after a discharge and recoil, whereby the breech-block is then moved to open the breech, as set forth.

2. In a machine-gun, the combination, with a fixed support and a barrel movable longitudinally therein and extended in the rear of the breech, of a breech-block carried in said extension and movable at right angles to the axis of the barrel for opening and closing the breech, breech mechanism connected therewith and carried by the barrel, and a stop carried by the fixed support and adapted to engage with and operate the breech mechanism for moving the breech-block and opening the breech on the return or forward movement of the said mechanism after a discharge and recoil, as set forth.

3. In a machine-gun, the combination, with a fixed support, a barrel movable longitudinally therein, and a breech-block moving with the barrel and capable of an independent movement at right angles to the axis of said barrel for opening and closing the breech, of breech mechanism carried by the barrel, a crank-shaft for operating the same, a hooked arm fixed to said crank-shaft, and a pawl pivoted to the fixed support and adapted to pass the said hooked arm in the movement of the barrel in one direction, but to engage with said arm in the movement of the barrel in the opposite direction, as set forth.

4. In a gun, the combination of an automatically-retracted breech-block movable transversely to the breech and a detent for locking the same in its open position, adapted to be tripped or operated to release the breech-block by the insertion of a cartridge into the barrel, as set forth.

5. The combination, with a fixed support, a sliding barrel, and means for storing the energy of its recoil and connected with the barrel so as to return it to position after a discharge, of a breech-block movable at right angles to the axis of the barrel, mechanism intermediate to the barrel and the breech-block for communicating movement to the breech-block, a stop on the fixed support adapted to engage with said mechanism on the forward or return movement of the barrel, whereby the breech is opened, and a locking device for engaging with the breech-block when open, adapted to be tripped or released by a cartridge when inserted into the barrel, as set forth.

6. The combination, in a gun, with a breech-block adapted to slide transversely to the barrel to open and close the breech, of an extractor operated by the movement of the breech-block and adapted to lock the same in its open position and to be tripped or operated to release the same by the insertion into the breech of a cartridge, as set forth.

7. In a machine-gun, the combination of a fixed support or frame, a barrel movable longitudinally therein, a breech-block moving with the barrel and capable of an independent movement at right angles to the axis of the barrel for opening and closing the breech, mechanism intermediate to the barrel and breech-block for communicating the transverse movement to the breech-block, and a pawl or stop pivoted to the stationary frame and adapted to engage with the mechanism for moving the breech-block on the forward or return movement of the barrel, as set forth.

8. The combination, with the breech-block movable transversely to the barrel, of the shaft D, mounted in bearings in an extension of the barrel and operatively connected with the breech-block for moving the same, the arm or projection $d^2$ on the shaft D, the spring $d^4$ for raising the breech-block, and the stop lever or pawl $b$ on the stationary frame, adapted to engage with the arm $d^2$, as set forth.

9. The combination, with the barrel, the transversely-movable breech-block, the shaft D, mounted in an extension from the barrel and provided with an arm for moving the breech-block, of a spring-pawl $b$, pivoted to the gun-frame and adapted to engage with an extension from shaft D, as and for the purpose set forth.

10. The combination, with a gun barrel and breech mechanism, substantially as described, of a spring-actuated cartridge-holder adapted to be locked under tension by the recoil of the gun and to be released by a cartridge placed therein, as herein set forth.

11. The combination, with a gun operating as above described and provided with a shoulder-piece or crutch connected by a rod with the gun-frame, of a sleeve fitted to slide upon the said rod and provided with a bracket in the rear of the breech for supporting the head end of a cartridge and with a spring-catch pivoted to it and extending along one side of the bracket, and a spring arranged to act upon the said sleeve, substantially as and for the purpose set forth.

12. The combination, with a gun, of a crutch or shoulder-piece K, the frame $K^3$, to which said crutch is pivoted, the tubular rod K', connecting the frame to the gun-frame, the segment $k^3$ on the gun-frame, the rod $k^2$, and the lever $k$, operated by the crutch to engage or disengage the segment $k^3$ and rod $k^2$, as set forth.

13. The combination, with the gun, of the shoulder-piece or crutch connected therewith, and the guard-plate adjustable upon the part connecting the shoulder-piece to the gun, as set forth.

In testimony whereof I have hereunto signed my name in the presence of two subscribing witnesses.

HIRAM STEVENS MAXIM.

Witnesses:
DAVID YOUNG,
ARTHUR E. TRACY.